(12) United States Patent
Shen

(10) Patent No.: US 7,257,714 B1
(45) Date of Patent: Aug. 14, 2007

(54) ELECTRONIC DATA STORAGE MEDIUM WITH FINGERPRINT VERIFICATION CAPABILITY

(75) Inventor: Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 09/478,720

(22) Filed: Jan. 6, 2000

(30) Foreign Application Priority Data

Oct. 19, 1999 (TW) .............................. 88217720 U

(51) Int. Cl.
*H04K 1/00* (2006.01)
*H04L 9/00* (2006.01)

(52) U.S. Cl. ...................... 713/186; 713/167; 713/185; 713/189; 713/193; 382/115; 382/116

(58) Field of Classification Search ................ 713/186, 713/167, 185, 189, 193; 380/217; 382/115, 382/116
See application file for complete search history.

(56) References Cited

U.S. PATENT DOCUMENTS

| | | | | |
|---|---|---|---|---|
| 5,623,552 A | * | 4/1997 | Lane | ........................... 382/124 |
| 5,959,541 A | * | 9/1999 | DiMaria et al. | ............ 340/5.52 |
| 6,012,636 A | * | 1/2000 | Smith | .......................... 235/380 |
| 6,069,920 A | * | 5/2000 | Schulz et al. | ................ 375/242 |
| 6,125,192 A | * | 9/2000 | Bjorn et al. | ................. 382/124 |
| 6,193,152 B1 | * | 2/2001 | Fernando et al. | ............ 235/380 |
| 6,321,478 B1 | * | 11/2001 | Klebes | ........................... 42/84 |
| 2001/0043174 A1 | * | 11/2001 | Jacobsen et al. | .............. 345/87 |

* cited by examiner

*Primary Examiner*—Kim Vu
*Assistant Examiner*—Beemnet W Dada
(74) *Attorney, Agent, or Firm*—Bever, Hoffman & Harms, LLP; Patrick T. Bever

(57) ABSTRACT

In an electronic data storage medium accessed by a data terminal, a fingerprint sensor scans a fingerprint of a user of the electronic data storage medium and generals fingerprint scan data. A processing unit is operable operable selectively in a programming mode, where the processing unit activates an input/output interface circuit to store a data file and fingerprint reference data obtained by scanning a fingerprint of a person authorized to access the data file in a memory device, and a data retrieving mode, where the processing unit activates the input/output interface circuit to transmit the data file to the data terminal upon verifying that the user of the electronic data storage medium is authorized to access the data file stored in the memory device as a result of comparison between the fingerprint scan data from the fingerprint sensor and the fingerprint reference data.

13 Claims, 1 Drawing Sheet

ELECTRONIC DATA STORAGE MEDIUM WITH FINGERPRINT VERIFICATION CAPABILITY

BACKGROUND OF THE INVENTION

1. Field of the Invention

The invention relates to an electronic data storage medium, more particularly to an electronic data storage medium with a fingerprint verification capability.

2. Description of the Related Art

At present, confidential data files are stored in floppy disks or are delivered via networks that require passwords or that use encryption coding for security. Confidential documents can be sent by adding safety seals and impressions during delivering. However, the aforesaid are exposed to the risks of breaking of the passwords, encryption codes, safety seals and impressions, thereby resulting in unsecure transfer of information.

SUMMARY OF THE INVENTION

Therefore, the object of the present invention is to provide an electronic data storage medium with a fingerprint verification capability for security during the transfer of information.

According to the present invention, an electronic data storage medium is adapted to be accessed by a data terminal. The electronic data storage medium includes a memory device, a fingerprint sensor, an input-output interface circuit and a processing unit.

The memory device stores a data file and fingerprint reference data obtained by scanning a fingerprint of a person authorized to access the data file.

The fingerprint sensor is adapted to scan a fingerprint of a user of the electronic data storage medium and to generate fingerprint scan data.

The input/output interface circuit is activable so as to establish communication with the data terminal.

The processing unit is connected to the memory device, the fingerprint sensor and the input/output interface circuit. The processing unit is operable selectively in
- a programming mode, where the processing unit activates the input/output interface circuit to receive the data file and the fingerprint reference data from the data terminal, and to store the data file and the fingerprint reference data in the memory device, and
- a data retrieving mode, where the processing unit receives the fingerprint scan data from the fingerprint sensor, compares the fingerprint scan data with the fingerprint reference data in the memory device to verify if the user of the electronic data storage medium is authorized to access the data file stored in the memory device, and activates the input/output interface circuit to transmit the data file to the data terminal upon verifying that the user of the electronic data storage medium is authorized to access the data file stored in the memory device.

BRIEF DESCRIPTION OF THE DRAWING

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
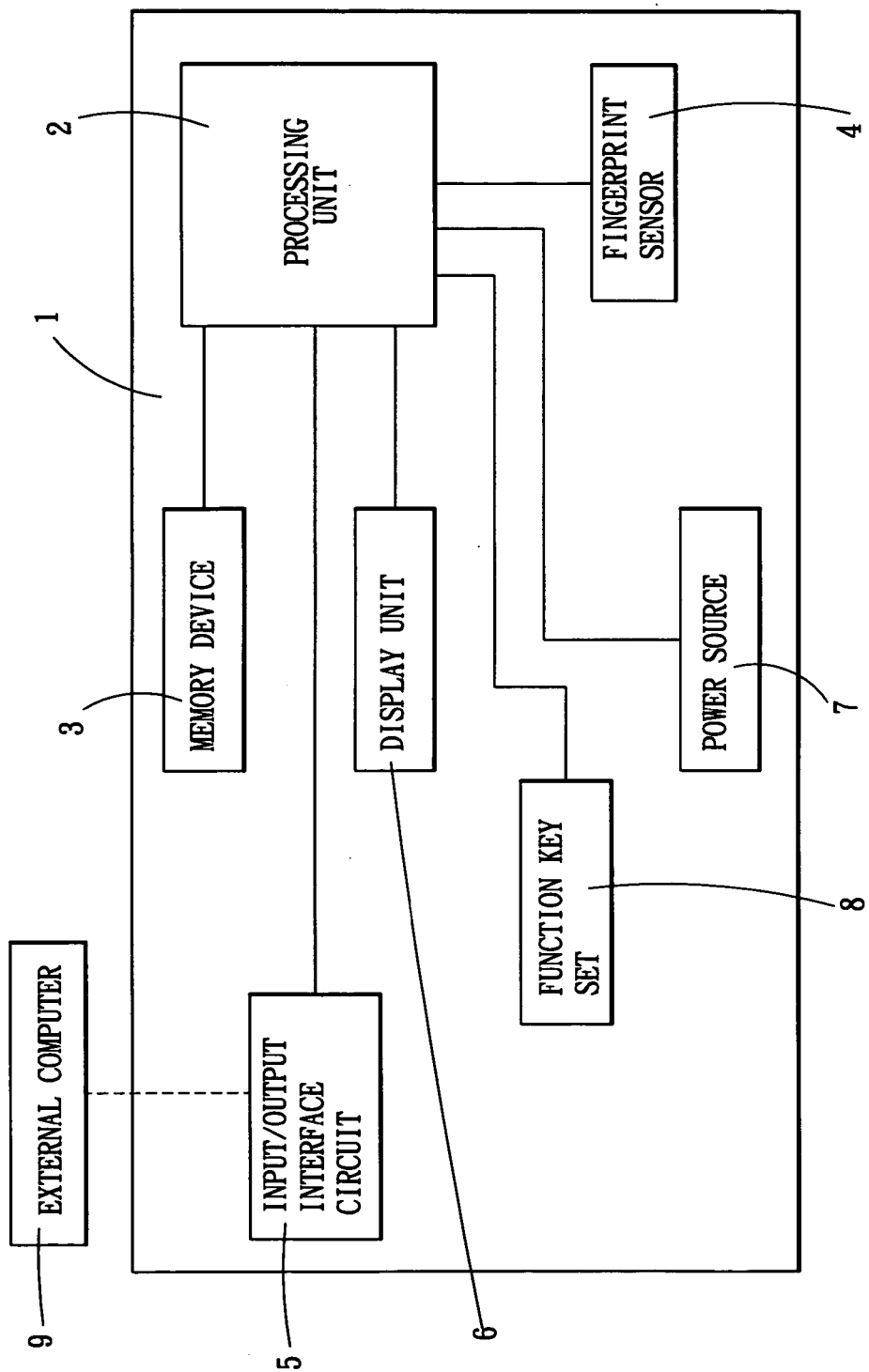
FIG. 1 is a schematic circuit block diagram illustrating the preferred embodiment of an electronic data storage medium according to the present invention.

Referring to FIG. 1, according to the preferred embodiment of the present invention, an electronic data storage medium is adapted to be accessed by an external computer 9, and is shown to include a card body 1, a processing unit 2, a memory device 3, a fingerprint sensor 4, an input/output interface circuit 5, a display unit 6, a power source 7, and a function key set 8.

The memory device 3, such as a flash memory device, is mounted on the card body 1, and stores a data file, a reference password, and fingerprint reference data obtained by scanning a fingerprint of a person authorized to access the data file in a known manner therein. The data file can be a picture file or a text file.

The fingerprint sensor 4 is mounted on the card body 1, and is adapted to scan a fingerprint of a user of the electronic data storage medium and to generate fingerprint scan data. One example of the fingerprint sensor 4 that can be used in the present invention is that disclosed in a co-pending U.S. patent application, entitled "INTEGRATED CIRCUIT CARD WITH FINGERPRINT VERIFICATION CAPABILITY", filed by the applicant of this application, the entire disclosure of which is incorporated herein by reference.

The input/output interface circuit 5, such as a PCMCIA or RS232 interface, is mounted on the card body 1, and is activable so as to establish communication with the external computer 9.

The processing unit 2 is mounted on the card body 1, and is connected to the memory device 3, the fingerprint sensor 4 and the input/output interface circuit 5. The processing unit 2 is operable selectively in:
- a programming mode, where the processing unit 2 activates the input/output interface circuit 5 to receive the data file and the fingerprint reference data from the external computer 9, and to store the data file and the fingerprint reference data in the memory device 3 in a compressed format to increase storage capacity of the memory device 3;
- a data retrieving mode, where the processing unit 2 receives the fingerprint scan data from the fingerprint sensor 4, compares the fingerprint scan data with at least a segment of the fingerprint reference data in the memory device 3 to verify if the user of the electronic data storage medium is authorized to access the data file stored in the memory device 3, and activates the input/output interface circuit 5 to transmit the data file to the external computer 9 upon verifying that the user of the electronic data storage medium is authorized to access the data file stored in the memory device 3; and
- a data resetting mode, where the data file and the finger reference data are erased from the memory device 3.

The power source 7 is mounted on the card body 1, and is connected to the processing unit 2 for supplying electrical power thereto.

The function key set 8, which is mounted on the card body 1, is connected to the processing unit 2, and is operable so as to initiate operation of the processing unit 2 in a selected one of the programming, data retrieving and data resetting modes. The function key set 8 is operable to provide an input password to the processing unit 2. The processing unit 2 compares the input password with the reference password in the memory device 3, and initiates operation in the data resetting mode upon verifying that the input password corresponds with the reference password.

The display unit 6 is mounted on the card body 1, and is connected to and controlled by the processing unit 2 for showing the data file exchanged with the external computer 9 and the operating status of the electronic data storage medium thereon.

Preferably, the processing unit 2 automatically initiates operation in the data resetting mode upon detecting that a preset time period has elapsed since storage of the data file and the fingerprint reference data in the memory device 3.

The following are some of the advantages of the present invention:

1. The electronic data storage medium has a small volume but a large storage capability in a compressed format, thereby resulting in convenience during data transfer.

2. Since everyone has a fingerprint different from that of the others, the electronic data storage medium only permits authorized persons to access the data files stored therein, thereby resulting in enhanced security.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic data storage medium adapted to be accessed by a data terminal, said electronic data storage medium comprising:

a non-volatile memory device for storing a data file and fingerprint reference data obtained by scanning a fingerprint of a person authorized to access the data file;

a fingerprint sensor adapted to scan a fingerprint of a user of said electronic data storage medium and to generate fingerprint scan data;

an input/output interface circuit activable so as to establish communication with the data terminal;

a processing unit connected to said non-volatile memory device, said fingerprint sensor and said input/output interface circuit, means for controlling said processing unit in a programming mode, where said processing unit activates said input/output interface circuit to receive the data file and the fingerprint reference data from the data terminal, and to store the data file and the fingerprint reference data in said non-volatile memory device, and means for controlling said processing unit in a data retrieving mode, which is performed subsequent to the programming mode, where said processing unit receives the fingerprint scan data from said fingerprint sensor, compares the fingerprint scan data with the fingerprint reference data in said non-volatile memory device to verify if the user of said electronic data storage medium is authorized to access the data file stored in said non-volatile memory device, and activates said input/output interface circuit to transmit the data file to the data terminal upon verifying that the user of said electronic data storage medium is authorized to access the data file stored in said non-volatile memory device.

2. The electronic data storage medium of claim 1, further comprising a card body on which said non-volatile memory device, said fingerprint sensor, said input/output interface circuit and said processing unit are mounted.

3. The electronic data storage medium of claim 2, further comprising a power source mounted on said card body and connected to said processing unit for supplying electrical power thereto.

4. The electronic data storage medium of claim 1, wherein said non-volatile memory device is a flash memory device.

5. The electronic data storage medium of claim 1, wherein said processing unit stores the data file and the fingerprint reference data in said non-volatile memory device in a compressed format.

6. The electronic data storage medium of claim 1, further comprising a function key set connected to said processing unit and operable so as to initiate operation of said processing unit in a selected one of the programming and data retrieving modes.

7. The electronic data storage medium of claim 1, wherein said processing unit is further operable selectively in a data resetting mode, where the data file and the fingerprint reference data are erased from said non-volatile memory device.

8. The electronic data storage medium of claim of 7, further comprising a function key set connected to said processing unit and operable so as to initiate operation of said processing unit in a selected one of the programming, data retrieving and data resetting modes.

9. The electronic data storage medium of claim 8, wherein said memory device further stores a reference password therein, said function key set being operable to provide an input password to said processing unit, said processing unit comparing the input password with the reference password and initiating operation in the data resetting mode upon verifying that the input password corresponds with the reference password.

10. The electronic data storage medium of claim 7, wherein said processing unit automatically initiates operation in the data resetting mode upon detecting that a preset time period has elapsed since storage of the data file and the fingerprint reference data in said non-volatile memory device.

11. The electronic data storage medium of claim 1, further comprising a display unit connected to and controlled by said processing unit for showing the data file exchanged with the data terminal thereon.

12. An electronic data storage medium adapted to be accessed by a data terminal, said electronic data storage medium comprising:

a non-volatile memory device for storing a data file and fingerprint reference data;

a fingerprint sensor adapted to scan a fingerprint of a user of said electronic data storage medium and to generate fingerprint scan data;

an input/output interface circuit for establishing communication with the data terminal;

a processing unit coupled to said non-volatile memory device, said fingerprint sensor and said input/output interface circuit;

a function key set connected to said processing unit and operably arranged such that a user is enabled to initiate operation of said electronic data storage medium in a selected one of a programming mode and a data retrieving mode by manipulation of the function key set;

means for controlling said processing unit when the electronic data storage medium is in the programming mode such that the processing unit writes at least one of the data file and the fingerprint reference data into said non-volatile memory device; and means for controlling said processing unit when the electronic data storage medium is in the data retrieving mode such that the processing unit compares the fingerprint scan data entered through said fingerprint sensor with the fingerprint reference data stored in said non-volatile memory device, and transmits the data file through said input/output interface circuit to the data terminal only when the fingerprint scan data matches the fingerprint reference data.

13. The electronic data storage medium of claim 12, wherein said non-volatile memory device further comprises means for storing a reference password therein, and wherein said function key set includes means for transmitting an input password manually entered by a user to said processing unit, and wherein the electronic data storage medium further comprises means for controlling said processing unit to compare the input password with the reference password and initiating operation in the data resetting mode upon verifying that the input password corresponds with the reference password.

* * * * *

UNITED STATES PATENT AND TRADEMARK OFFICE
CERTIFICATE OF CORRECTION

PATENT NO. : 7,257,714 B1
APPLICATION NO. : 09/478720
DATED : August 14, 2007
INVENTOR(S) : Shen Page 1 of 1

It is certified that error appears in the above-identified patent and that said Letters Patent is hereby corrected as shown below:

On the title page item [75], change "Ming-Shiang Shen, Taipei (TW)" to --Ming-Shiang Shen, Taipei (CN)--

Signed and Sealed this
Twenty-ninth Day of December, 2015

Michelle K. Lee
*Director of the United States Patent and Trademark Office*